US011231142B2

(12) United States Patent
Tanaka

(10) Patent No.: US 11,231,142 B2
(45) Date of Patent: Jan. 25, 2022

(54) GREASE REPLACEMENT METHOD AND GREASE SUCTION DEVICE

(71) Applicant: TAIYO, LTD., Osaka (JP)

(72) Inventor: Kazuhiko Tanaka, Osaka (JP)

(73) Assignee: TAIYO, LTD., Osaka (JP)

( * ) Notice: Subject to any disclaimer, the term of this patent is extended or adjusted under 35 U.S.C. 154(b) by 652 days.

(21) Appl. No.: 16/309,419

(22) PCT Filed: May 30, 2017

(86) PCT No.: PCT/JP2017/020021
§ 371 (c)(1),
(2) Date: Dec. 12, 2018

(87) PCT Pub. No.: WO2017/217227
PCT Pub. Date: Dec. 21, 2017

(65) Prior Publication Data

US 2019/0309900 A1    Oct. 10, 2019

(30) Foreign Application Priority Data

Jun. 15, 2016 (JP) .............................. JP2016-118797

(51) Int. Cl.
*F16N 11/10* (2006.01)
*F16N 31/00* (2006.01)
(Continued)

(52) U.S. Cl.
CPC ........... *F16N 11/10* (2013.01); *B25J 19/0062* (2013.01); *B25J 19/0066* (2013.01); *F16N 7/14* (2013.01);
(Continued)

(58) Field of Classification Search
CPC ...... F16N 11/10; F16N 31/00; F16N 2210/12; F16N 7/14; F16N 21/04; F16N 37/00; B25J 19/0062; B25J 19/0066; F16C 33/66
(Continued)

(56) References Cited

U.S. PATENT DOCUMENTS 2,223,553 A * 12/1940 Davis ....................... C23G 3/00
141/28
2,312,857 A * 3/1943 Woelfer, Jr. ............ F16N 13/16
417/264

(Continued)

FOREIGN PATENT DOCUMENTS

JP    57-033224 A    2/1982
JP    06-221331 A    8/1994
(Continued)

OTHER PUBLICATIONS

Office Action received for Korean Patent Application No. 10-2018-7036238, dated Jan. 13, 2020, 8 pages (4 pages of English Translation and 4 pages of Office Action).

(Continued)

*Primary Examiner* — Michael R Mansen
*Assistant Examiner* — Mark K Buse
(74) *Attorney, Agent, or Firm* — Womble Bond Dickinson (US) LLP

(57) ABSTRACT

The present invention relates to a grease replacement method of replacing grease in a case (84) including a sealable gear chamber (31, 36) accommodating a gear (85) as a member to be lubricated, a grease injection port (61, 62) configured to inject grease into the gear chamber (31, 36), and a discharge port (32, 37) configured to discharge the grease in the gear chamber (31, 36), and a grease suction device to be used to perform this method. The grease (Continued)

replacement method includes a suction step (S2) of sucking the grease in the gear chamber (31, 36) from the grease injection port (61, 62) with the discharge port (32, 37) being open, and discharging the grease outside the case (84), and an injection step (S4) of injecting new grease into the grease injection port (61, 62) and supplying the new grease to the gear (85). This facilitates discharging of old grease.

20 Claims, 13 Drawing Sheets

(51) Int. Cl.
  *F16N 37/00* (2006.01)
  *F16N 7/14* (2006.01)
  *F16N 23/00* (2006.01)
  *B25J 19/00* (2006.01)
  *F16N 21/04* (2006.01)
  *F16N 11/00* (2006.01)

(52) U.S. Cl.
  CPC ............. *F16N 11/00* (2013.01); *F16N 21/04* (2013.01); *F16N 31/00* (2013.01); *F16N 37/00* (2013.01); *F16N 23/00* (2013.01); *F16N 2210/12* (2013.01)

(58) Field of Classification Search
  USPC .......................................................... 184/58
  See application file for complete search history.

(56) References Cited

U.S. PATENT DOCUMENTS

| | | | | |
|---|---|---|---|---|
| 2,390,762 | A * | 12/1945 | Woelfer, Jr. | ............ F04B 53/00 417/284 |
| 4,819,764 | A * | 4/1989 | Huang | ..................... F16N 5/00 184/36 |
| 6,521,051 | B1 * | 2/2003 | Lutich | ..................... A47L 5/365 134/21 |
| 8,240,433 | B2 * | 8/2012 | Tseng | ........................ F04B 9/14 184/1.5 |
| 9,315,372 | B2 * | 4/2016 | Doi | ........................ F16N 11/10 |
| 2005/0133305 | A1 | 6/2005 | Okada et al. | |
| 2006/0162751 | A1 * | 7/2006 | Gonzalez | ................ F16H 57/04 134/169 A |
| 2013/0256062 | A1 * | 10/2013 | Kotyk | ..................... F16K 31/26 184/36 |

FOREIGN PATENT DOCUMENTS

| | | |
|---|---|---|
| JP | 07-010193 A | 1/1995 |
| JP | 2000-110197 A | 4/2000 |
| JP | 2005-177914 A | 7/2005 |
| JP | 2006-316814 A | 11/2006 |
| JP | 2007-020461 A | 2/2007 |
| JP | 2010-048292 A | 3/2010 |
| JP | 2010-054199 A | 3/2010 |
| JP | 2010-091005 A | 4/2010 |
| JP | 2013-068306 A | 4/2013 |

OTHER PUBLICATIONS

International Search Report and Written Opinion received for PCT Patent Application No. PCT/JP2017/020021, dated Aug. 29, 2017, 15 pages (7 pages of English Translation and 8 pages of Original Document).

International Preliminary Report on Patentability received for PCT Patent Application No. PCT/JP2017/020021, dated Dec. 27, 2018, 12 pages (6 pages of English Translation and 6 pages of Original Document).

* cited by examiner

GREASE REPLACEMENT METHOD AND GREASE SUCTION DEVICE

TECHNICAL FIELD

The present invention relates to a grease replacement method of replacing grease in a built-in speed reducer of a robot, and a grease suction device to be used to perform this method.

BACKGROUND ART

Conventionally, speed reducers incorporated in industrial robots, machine tools, and the like are lubricated by grease. This grease is replaced regularly. As described in, for example, patent literature 1, grease replacement is performed by injecting grease into a portion to be lubricated by using a grease gun. Patent literature 1 discloses a sealable gear chamber as the portion being lubricated.

This grease replacement method disclosed in patent literature 1 is performed by injecting grease by a grease gun into a lubricating oil injection port of the portion to be lubricated in a state in which a discharge tube is connected to a discharge port of the portion to be lubricated. When grease is injected into the lubricating oil injection port, the grease is injected into the portion to be lubricated, and old grease in the portion to be lubricated is discharged by being pushed out from the discharge port.

RELATED ART LITERATURE

Patent Literature

Patent Literature 1: Japanese Patent Laid-Open No. 2005-177914

DISCLOSURE OF INVENTION

Problem to be Solved by the Invention

This grease replacement method described in patent literature 1 has the problem that old grease cannot sufficiently be discharged. To replace the entire old grease with new grease in this grease replacement method, it is necessary to evenly push out the old grease by the new grease. In the grease replacement method described in patent literature 1, however, a passage of the new grease forms in the old grease from the lubricating oil injection port for injecting grease to the discharge port for discharging grease, and it is difficult to completely discharge the old grease around the passage. Also, when the discharge port does not have sufficient size, or when the old grease is stiff and does not flow easily, the pressure of the gear chamber rises when injecting new grease, and this may break a seal for sealing the portion to be lubricated.

The first object of the present invention is to provide a grease replacement method which facilitates discharging old grease. The second object of the present invention is to provide a grease suction device capable of easily performing this grease replacement method.

Means of Solution to the Problem

To achieve the first object, a grease replacement method according to the present invention is a grease replacement method of replacing grease in a case including a sealable gear chamber accommodating a gear as a member to be lubricated, a grease injection port configured to inject grease into the gear chamber, and a discharge port configured to discharge the grease in the gear chamber, the method being performed by a suction step of sucking the grease in the gear chamber from the grease injection port with the discharge port being open, and discharging the grease outside the case, and an injection step of injecting new grease into the grease injection port and supplying the new grease to the gear.

A grease suction device according to the present invention comprises an air cylinder including a cylinder main body which includes a cylindrical member and walls closing two ends of the cylindrical member, and a piston which partitions the cylinder main body into a first air chamber and a second air chamber, a valve formed in the piston configured to have the first air chamber and the second air chamber communicate with each other when a spacing between the piston and a wall in one end of the cylinder main body is less than a predetermined distance, and configured to block the communication between the first air chamber and the second air chamber when the spacing is equal to or greater than the predetermined distance, a first connecting member formed on the wall in one end of the cylinder main body, and configured to connect a negative-pressure source to one of the first air chamber and the second air chamber, and a second connecting member formed on a wall in the other end of the cylinder main body configured to connect a grease injection port of a case into which grease is injected to the other one of the first air chamber and the second air chamber.

Effect of the Invention

According to the present invention, old grease in the gear chamber is sucked and discharged from the grease injection port in the suction step. In this step, air flows into the gear chamber from the discharge port. Therefore, old grease is discharged without excessively raising the internal pressure of the gear chamber, and this makes it possible to provide a grease replacement method which facilitates discharging of old grease.

Also, the grease suction device according to the present invention is capable of sucking grease into the cylinder main body from the grease injection port of the gear chamber and storing the grease in the cylinder main body. Accordingly, it is possible to provide a grease suction device capable of easily performing the above-described grease replacement method.

BEST MODE FOR CARRYING OUT THE INVENTION

First Embodiment

An embodiment of a grease replacement method and grease suction device according to the present invention will be explained in detail below with reference to FIGS. 1 to 8.

Figure 1:
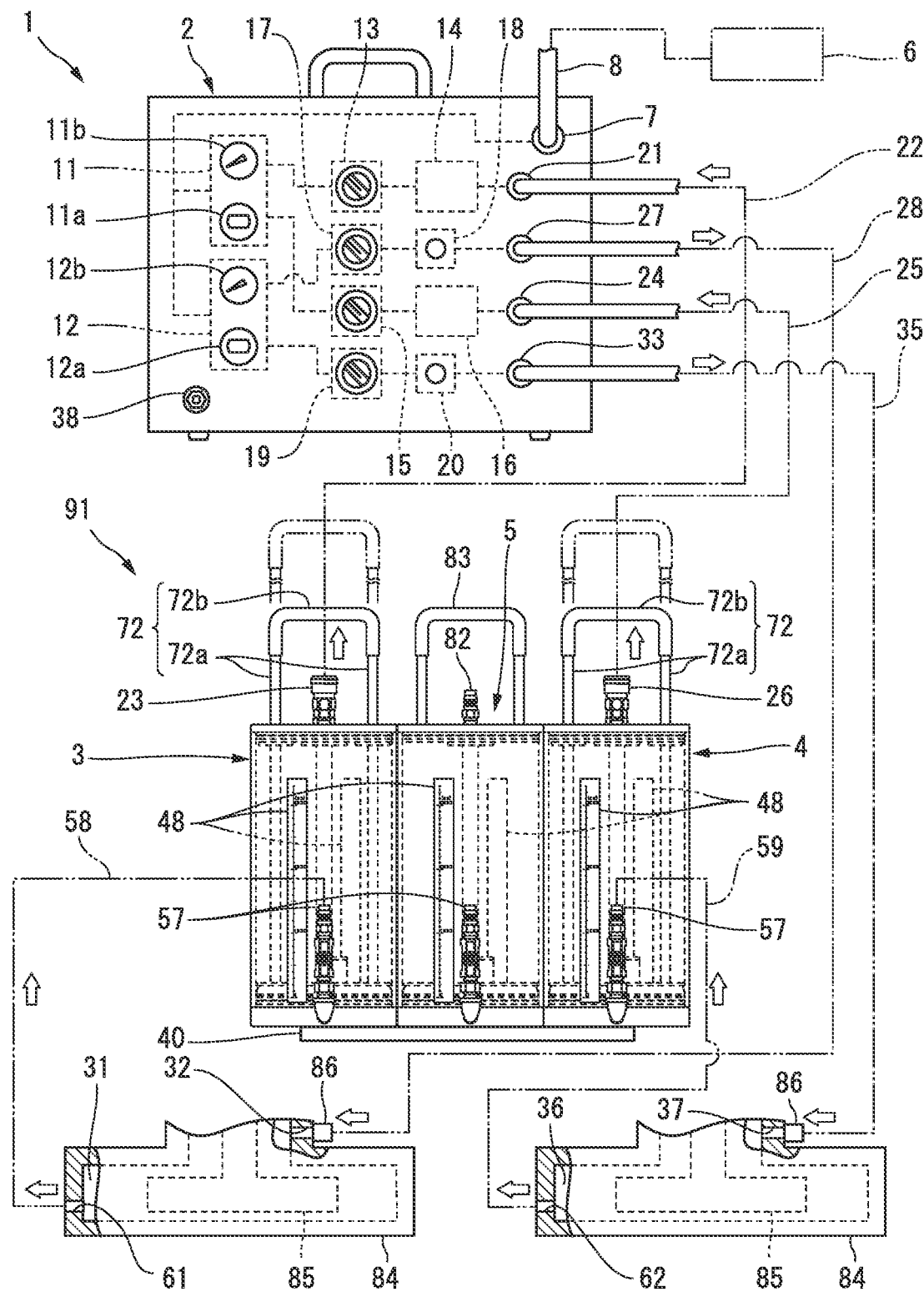
FIG. 1 is a front view showing the arrangement of a grease replacement apparatus to be used to perform a grease replacement method according to the first embodiment.

A grease replacement apparatus 1 shown in FIG. 1 is an apparatus for performing the grease replacement method according to the present invention. As shown in a flowchart of FIG. 2, this grease replacement method of the present invention is a method of performing tube connection step S1, suction step S2, ejection destination change step S3, injection step S4, tube disconnection step S5, grease disposal step S6, and the like in this order.

<Arrangement of Grease Replacement Apparatus>

As shown in FIG. 1, the grease replacement apparatus 1 for performing this grease replacement method includes a control box 2 drawn in the uppermost portion of FIG. 1, first and second suction air cylinders 3 and 4 connected to the control box 2 by a plurality of air tubes (to be described later), and an injection air cylinder 5.

The control box 2 has first and second functions. The first function is a function of guiding compressed air supplied from an air supply source 6 to vacuum ejectors 14 and 16 (to be described later), thereby generating a predetermined negative pressure in the vacuum ejectors 14 and 16. The second function is a function of guiding compressed air supplied from the air supply source 6 to speed controllers 18 and 20 (to be described later), thereby generating a predetermined positive pressure in the speed controllers 18 and 20. The compressed air in the air supply source 6 is supplied by a high-pressure air tube 8 to a compressed air coupler plug 7 positioned in the uppermost portion of the control box 2.

<Arrangement of Control Box>

The control box 2 includes first and second regulators 11 and 12. The compressed air is guided from the compressed air coupler plug 7 to the first and second regulators 11 and 12. The first and second regulators 11 and 12 respectively include adjustment knobs 11a and 12a and pressure gauges 11b and 12b, and can reduce the pressure of the compressed air guided from the compressed air coupler plug 7 to a predetermined pressure.

The first and second vacuum ejectors 14 and 16 are connected to the first regulator 11 via first and third opening/closing valves 13 and 15.

The first and second speed controllers 18 and 20 are connected to the second regulator 12 via second and fourth opening/closing valves 17 and 19. The open state and closed state of each of the first, second, third, and fourth opening/closing valves 13, 15, 17, and 19 are manually switched.

The first and second vacuum ejectors 14 and 16 are devices which generate a negative pressure by using the positive-pressure air supplied from the first regulator 11.

This negative pressure is generated in a process in which the positive-pressure air is narrowed by nozzles (not shown) in the first and second vacuum ejectors 14 and 16 and ejected at high speed to a diffuser (not shown). In this embodiment, the first and second vacuum ejectors 14 and 16 are equivalent to "a negative pressure source" of the present invention. The first vacuum ejector 14 sucks air from a first suction coupler plug 21 via a vacuum filter (not shown). As shown in FIG. 1, the first suction coupler plug 21 can be connected to a coupler socket 23 of the first suction air cylinder 3 via a first air tube 22.

The second vacuum ejector 16 sucks air from a second suction coupler plug 24 via a vacuum filter (not shown). As shown in FIG. 1, the second suction coupler plug 24 can be connected to a coupler socket 26 of the second suction air cylinder 4 via a second air tube 25.

The first and second speed controllers 18 and 20 are devices which adjust the flow rate of the positive-pressure air supplied from the second regulator 12 by a throttle (not shown). The positive-pressure air (this positive-pressure air will simply be called "pressurized air" hereinafter) having passed through the first speed controller 18 is ejected from a first ejection coupler socket 27. As shown in FIG. 1, the first ejection coupler socket 27 can be connected to a first discharge port 32 of a first gear chamber 31 (to be described later) via a third air tube 28.

The positive-pressure air (this positive-pressure air will simply be called "pressurized air" hereinafter) having passed through the second speed controller 20 is ejected from a second ejection coupler socket 33. As shown in FIG. 1, the second ejection coupler socket 33 can be connected to a second discharge port 37 of a second gear chamber 36 (to be described later) via a fourth air tube 35. In this embodiment, the control box 2 including the first and second speed controllers 18 and 20 is equivalent to "a pressurized air supply device" of the present invention.

A drain discharge valve 38 is formed in the lowermost portion of the control box 2.

<Arrangement of Air Cylinders>

The first and second suction air cylinders 3 and 4 and injection cylinder 5 are arranged in the horizontal direction in a state in which their axes point in the vertical direction, and are connected to each other by a connecting member 40. In this embodiment, the injection air cylinder 5 is placed between the first suction air cylinder 3 and second suction air cylinder 4.

The first suction air cylinder 3 and second suction air cylinder 4 have the same arrangement. Therefore, in the following explanation of the arrangement of the first and second suction air cylinders 3 and 4, the arrangement of only the first suction air cylinder 3 will be explained.

<Arrangement of First and Second Suction Air Cylinders>

Figure 3:
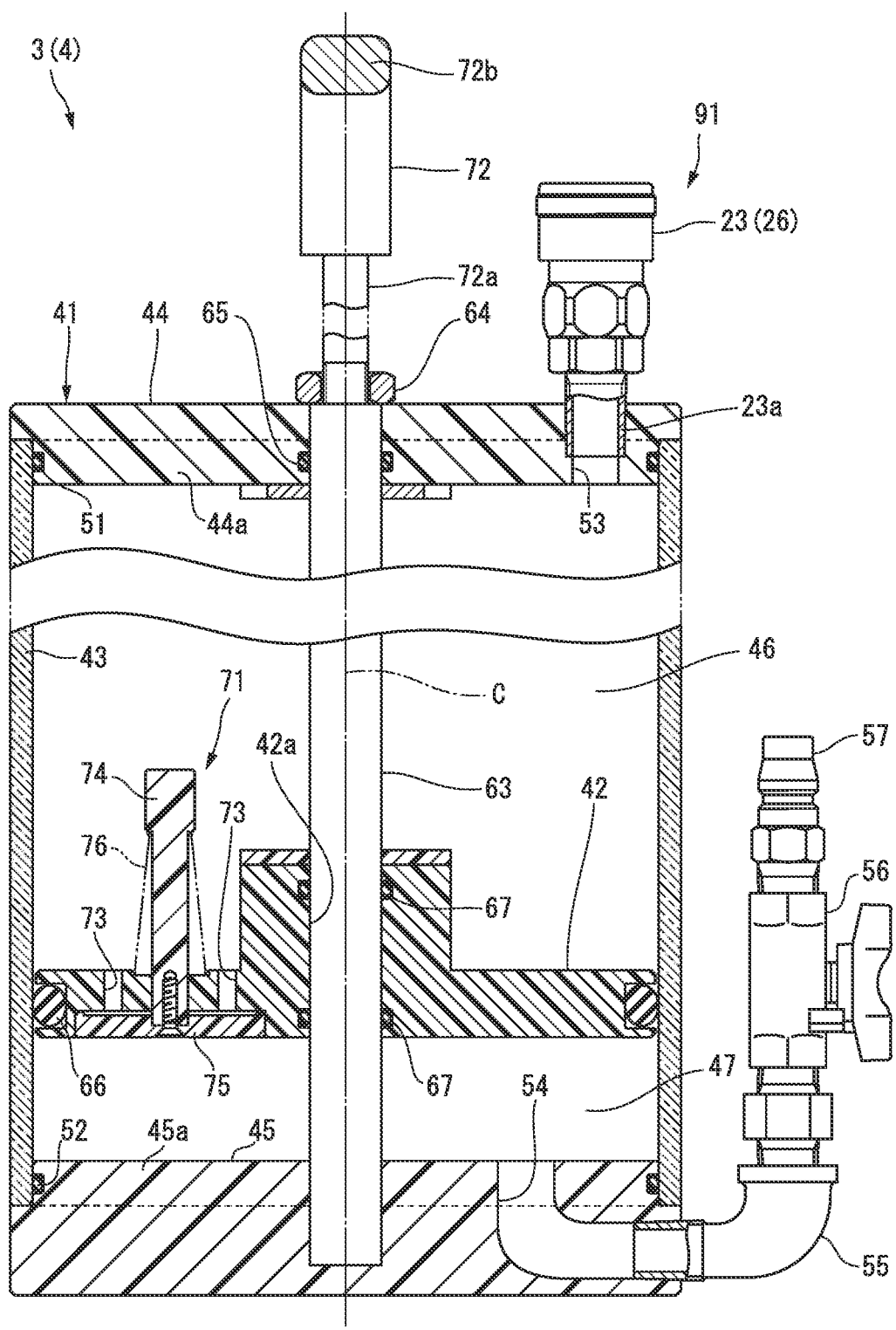
FIG. 3 is a sectional view of a suction air cylinder.

As shown in FIG. 3, the first suction air cylinder 3 includes a cylinder main body 41, and a piston 42 movably placed in the cylinder main body 41. FIG. 3 shows a state in which the piston 42 is positioned in an intermediate position. The cylinder main body 41 includes a cylindrical member 43 in which the piston 42 is movably fitted, an upper lid 44 which closes the upper end portion of the cylindrical member 43, and a lower lid 45 which closes the lower end portion of the cylindrical member 43. The piston 42 partitions the cylinder main body 41 into a first air chamber 46 positioned on the upper side, and a second air chamber 47 positioned on the lower side. In this embodiment, the first air chamber 46 is equivalent to "one" air chamber of the present invention, and the second air chamber 47 is equivalent to "the other" air chamber of the present invention.

The cylindrical member 43 is formed into a cylindrical shape by a transparent plastic material. A scale 48 (see FIG. 1) for measuring the amount of grease stored inside is formed on the outer circumferential surface of the cylindrical member 43 according to this embodiment. A central line C (see FIG. 3) of the cylindrical member 43 is equivalent to the axes of the first and second suction air cylinders 3 and 4. In this embodiment, the cylindrical member 43 is equivalent to "a cylindrical portion" of the present invention.

The upper lid 44 and lower lid 45 are formed into disk-like shapes, and respectively have projections 44*a* and 45*a* to be fitted in openings of the cylindrical member 43. The upper lid 44 and lower lid 45 are fixed to the cylindrical member 43 by an adhesive (not shown) with the projections 44*a* and 45*a* being fitted in the cylindrical member 43. A first sealing member 51 for sealing a portion between the upper lid 44 and cylindrical member 43 is formed on the outer circumferential surface of the projection 44*a* of the upper lid 44. A second sealing member 52 for sealing a portion between the lower lid 45 and cylindrical member 43 is formed on the projection 45*a* of the lower lid 45. In this embodiment, the upper lid 44 is equivalent to "a wall in one end of the cylinder main body" of the present invention, and the lower lid 45 is equivalent "a wall in the other end of the cylinder main body" of the present invention.

A through hole 53 is formed in the upper lid 44. The coupler socket 23 (or the coupler socket 26 for the second suction air cylinder 4) for connecting the first or second air tube 22 or 25 is attached to the through hole 53. A tubular screw portion 23*a* for attaching the coupler socket 23 communicates with the first air chamber 46. In this embodiment, the coupler sockets 23 and 26 are equivalent to "a first connecting member" of the present invention.

A communication hole 54 for causing the second air chamber 47 to communicate with the outside of the cylinder main body 41 is formed in the lower lid 45. A coupler plug 57 is connected to the outer opening of the communication hole 54 via an elbow 55 and an opening/closing valve 56.

As shown in FIG. 1, a first or second grease suction tube 58 or 59 is connected to the coupler plug 57 when sucking grease. As shown in FIG. 1, the first grease suction tube 58 connects the coupler plug 57 of the first suction air cylinder 3 and a grease injection port 61 of the first gear chamber 31. As shown in FIG. 1, the second grease suction tube 59 connects the coupler plug 57 of the second suction air cylinder 4 and a grease injection port 62 of the second gear chamber 36. In this embodiment, the elbow 55, opening/closing valve 56, and coupler plug 57 are equivalent to "a second connecting member" of the present invention.

As shown in FIG. 3, a guide rod 63 is formed in the core of the lower lid 45. The guide rod extends through the core of the piston 42, and movably supports the piston 42. The guide rod 63 is positioned on the same axis as that of the cylindrical member 43. The lower end of the guide rod 63 is fixed to the lower lid 45, and the upper end thereof is fixed to the upper lid 44 by a lock nut 64 through the upper lid 44. A third sealing member 65 for sealing a portion between the upper lid 44 and guide rod 63 is formed in that portion of the upper lid 44, through which the guide rod 63 extends.

<Arrangement of Piston>

The piston 42 is formed into a disk-like shape. A fourth sealing member 66 for sealing a portion between the piston 42 and cylindrical member 43 is formed on the outer circumferential surface of the piston 42. A through hole 42*a* is formed in the core of the piston 42. The guide rod 63 is fitted in the through hole 42*a*. A fifth sealing member 67 for sealing a portion between the through hole 42*a* and guide rod 63 is formed on the wall surface of the through hole 42*a*.

The piston 42 includes a check valve 71, and a handle rod 72 (see FIG. 1) is attached to the piston 42. The check valve 71 opens and closes a communication passage 73 (see FIG. 3) formed in the piston 42. The communication passage 73 extends through the piston 42 in the axial direction of the first suction air cylinder 3, thereby causing the first air chamber 46 and second air chamber 47 to communicate with each other.

<Arrangement of Check Valve>

The check valve 71 includes an axial portion 74 extending through the piston 42, a disk-like valve body 75 fixed to the end portion of the axial portion 74 on the side of the second air chamber 47, and a compression coil spring 76 for biasing the axial portion 74 upward. The valve body 75 is pushed against the piston 42 by the spring force of the compression coil spring 76, and closes the communication passage 73 on the side of the second air chamber 47 with no external force being applied to the axial portion 74. Since the valve body 75 closes the communication passage 73, the check valve 71 blocks the communication between the first air chamber 46 and second air chamber 47.

Figure 4:
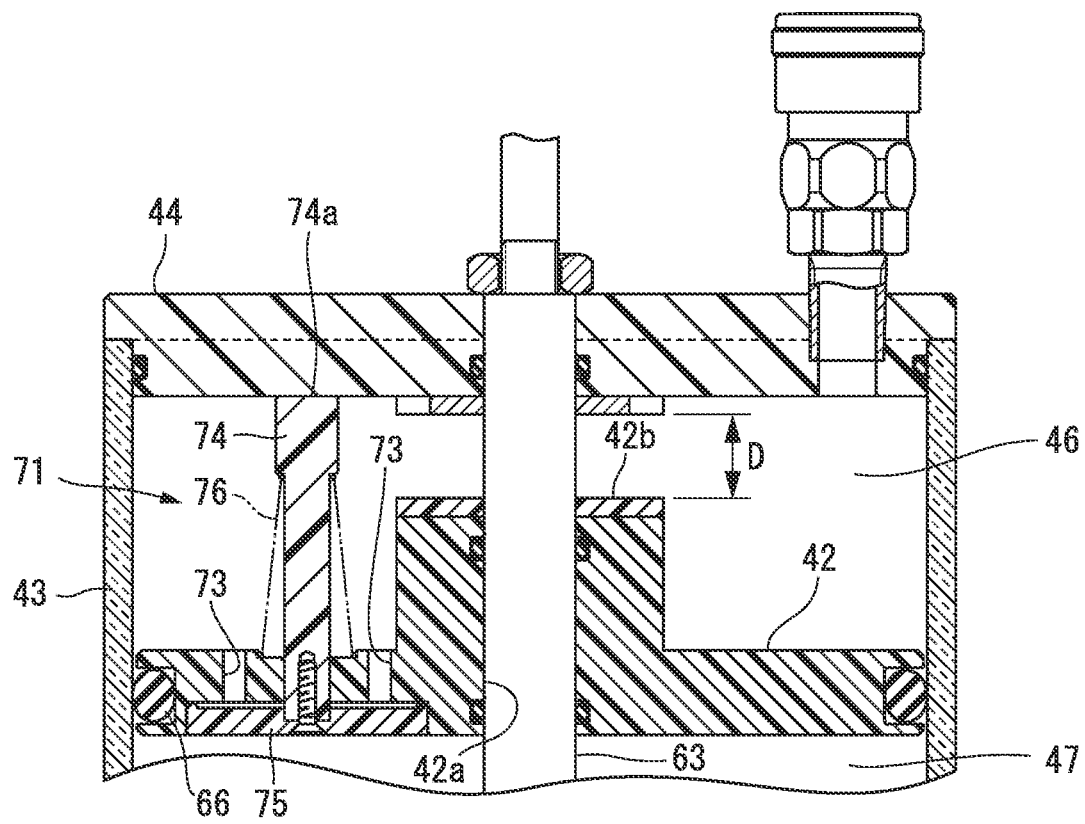
FIG. 4 is a sectional view of the main parts of the suction air cylinder.
Figure 5:
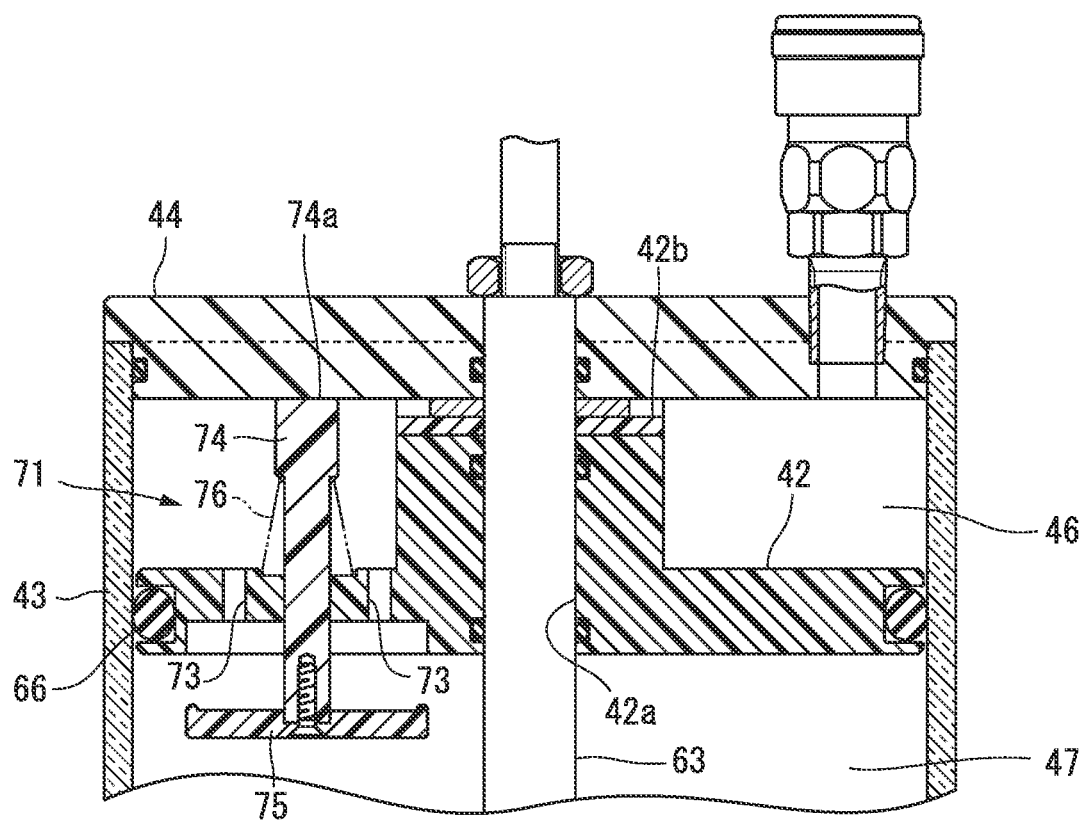
FIG. 5 is a sectional view of the main parts of the suction air cylinder.

The axial portion 74 projects upward more than the highest portion of the piston 42. Therefore, when the piston 42 rises from the position shown in FIG. 3 and the spacing between the upper end 42*b* of the piston 42 and the upper lid 44 reaches a predetermined distance D as shown in FIG. 4, an upper end 74*a* of the axial portion 74 comes in contact with the upper lid 44. As shown in FIG. 5, therefore, the check valve 71 opens when the piston 42 rises from the position shown in FIG. 4 (when the abovementioned spacing becomes shorter than the distance D). When the check valve 71 opens, the first air chamber 46 and second air chamber 47 communicate with each other through the communication passage 73. In this embodiment, the check valve 71 is equivalent to "a valve" of the present invention.

As shown in FIG. 1, the handle rod 72 includes two rod main bodies 72*a* extending parallel to the axis of the first suction air cylinder 3, and a handle 72*b* connecting the upper ends of the rod main bodies 72*a*. The lower ends of the rod main bodies 72*a* are fixed to the piston 42. The other end of the rod main body 72*a* projects outside the cylinder main body 41 through the upper lid 44.

<Arrangement of Injection Air Cylinder>

Figure 6:
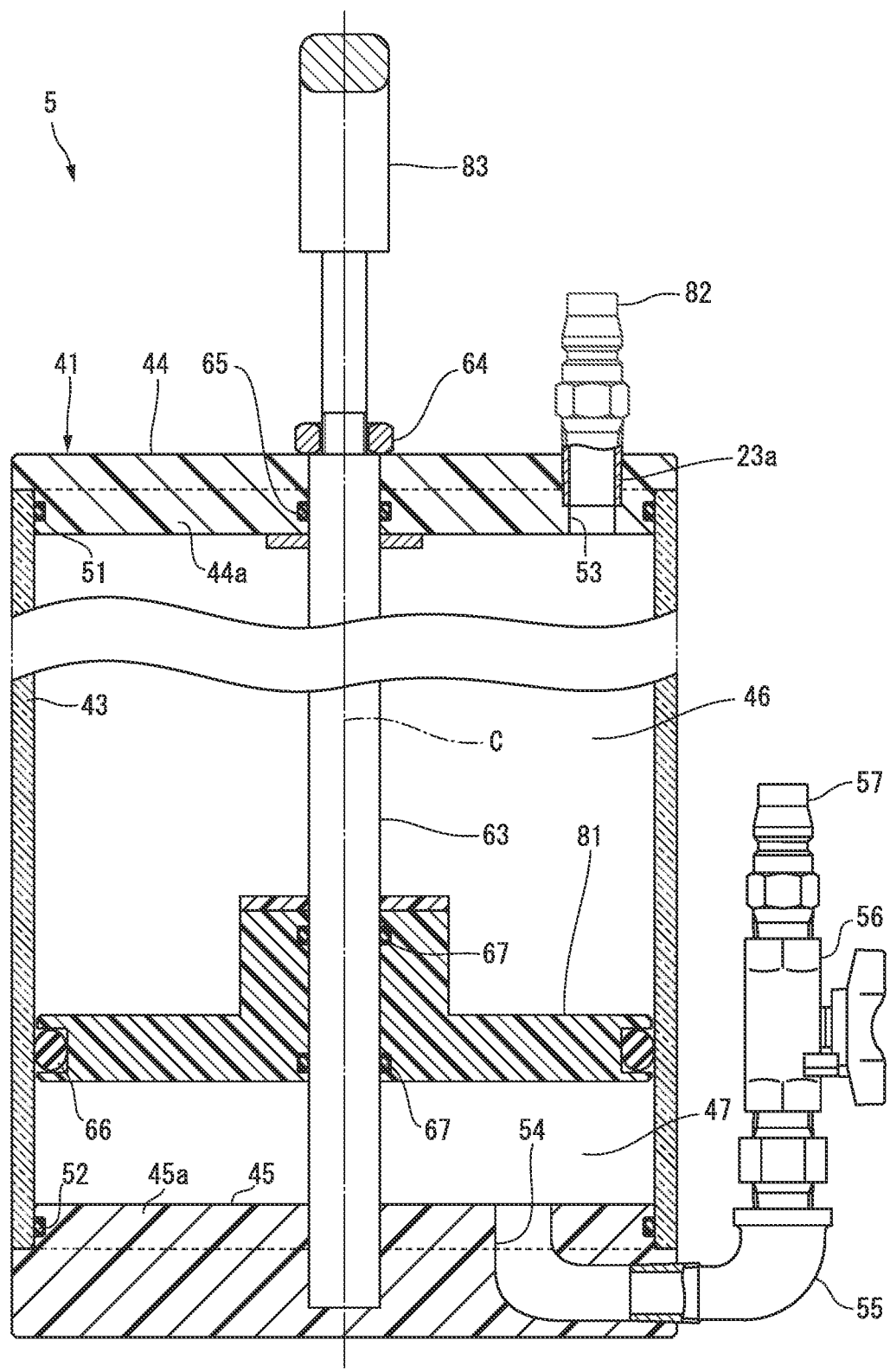
FIG. 6 is a sectional view of an injection air cylinder.

The injection air cylinder 5 is a device for injecting new grease into the first and second gear chambers 31 and 36. As shown in FIG. 6, a main difference of the injection air cylinder 5 according to this embodiment from the first and second suction air cylinders 3 and 4 is the piston arrangement, and the rest are equally formed. Therefore, the same reference numerals as used in the first and second suction air cylinders 3 and 4 denote the same members or equivalent members in the injection air cylinder 5, and a detailed explanation thereof will properly be omitted.

A piston 81 of the injection air cylinder 5 does not include members equivalent to the check valve 71 and handle rod 72 of the first and second suction air cylinders 3 and 4. Also, a coupler plug 82 and a handle 83 are attached to the upper lid 44 of the injection air cylinder 5. The coupler plug 82 is connected to the first air chamber 46.

As shown in FIG. 1, the grease replacement apparatus 1 according to this embodiment is connected to the first and second gear chambers 31 and 36 when in use. The grease replacement apparatus 1 according to this embodiment can suck grease from the first and second gear chambers 31 and 36 at the same time.

Although details are not shown, the first and second gear chambers 31 and 36 are formed by cases 84 each of which accommodates a gear speed reducer of an industrial robot or machine tool.

The cases 84 have first and second grease injection ports 61 and 62 for injecting grease into the first and second gear chambers 31 and 36, and first and second discharge ports 32 and 37 for discharging grease from the first and second gear chambers 31 and 36. The first and second grease injection ports 61 and 62 are formed in the lower portions of the cases 84. The first and second grease injection ports 61 and 62 are normally detachably attached to grease nipples (not shown), and closed by these grease nipples.

The first and second discharge ports 32 and 37 are formed in the upper portions of the cases 84. When grease is injected, air and old grease in the first and second gear chambers 31 and 36 are discharged from the first and second discharge ports 32 and 37.

Plug members (not shown) are normally detachably attached to the first and second discharge ports 32 and 37, and close the first and second discharge ports 32 and 37.

The first and second gear chambers 31 and 36 become sealed spaces when the first and second discharge ports 32 and 37 and grease injection ports 61 and 62 are closed. Gears 85 as members to be lubricated are accommodated in the first and second gear chambers 31 and 36. A predetermined amount of grease is injected into the first and second gear chambers 31 and 36.

<Configuration of Grease Replacement Method>

Next, the grease replacement method according to the present invention will be explained in detail with reference to a flowchart shown in FIG. 2. The grease replacement method according to the present invention is performed from tube connection step S1. In tube connection step S1, as shown in FIG. 1, the coupler socket 23 of the first suction air cylinder 3 is connected to the first suction coupler plug 21 of the control box 2 by the first air tube 22. Then, the coupler plug 57 of the first suction air cylinder 3 is connected to the grease injection port 61 of the first gear chamber 31 by the first grease suction tube 58.

Also, the coupler socket 26 of the second suction air cylinder 4 is connected to the second suction coupler plug 24 of the control box 2 by the second air tube 25. In addition, the coupler plug 57 of the second suction air cylinder 4 is connected to the grease injection port 62 of the second gear chamber 36 by the second grease suction tube 59. When connecting the first and second grease suction tubes 58 and 59 to the grease injection ports 61 and 62, dedicated joints (not shown) are connected instead of the grease nipples attached to the grease injection ports 61 and 62. The dedicated joints are thus used because the flow direction of grease is opposite to that of the grease nipple which regulates the outflow of grease.

Furthermore, one end portion of the third air tube 28 is connected to the first ejection coupler socket 27 of the control box 2, and the other end portion of the third air tube 28 is connected to the first discharge port 32 of the first gear chamber 31 via a connection joint 86 (to be described later). Also, one end portion of the fourth air tube 35 is connected to the second ejection coupler socket 33 of the control box 2, and the other end portion of the fourth air tube 35 is connected to the second discharge port 37 of the second gear chamber 36 via a connection joint 86.

Figure 7:
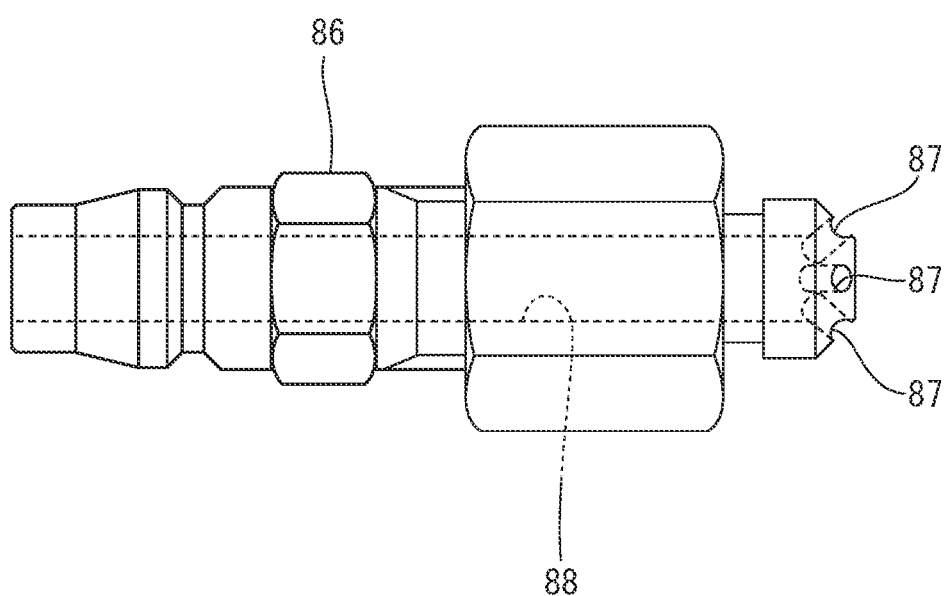
FIG. 7 is a side view of a connection joint.

As shown in FIG. 7, the connection joint 86 is a joint having a plurality of holes 87 formed in the distal end portion. The holes 87 radially extend from an air hole 88 in a central portion when viewed in the axial direction of the connection joint 86. The holes 87 so incline that one end connected to the air hole 88 and the other end which opens to the outer surface of the connection joint 86 are spaced apart from each other in the longitudinal direction of the connection joint 86. The other end of the hole 87 is positioned closer to the distal end of the connection joint 86 than one end.

Tube connection step S1 is ended when the various air tubes are connected as described above, and a grease suction device 91 including the first or second suction air cylinder 3 or 4 is connected to the control box 2. The grease suction device 91 according to this embodiment includes the first or second suction air cylinder 3 or 4, the check valve 71, the coupler socket 23 or 26 formed in the first or second suction air cylinder 3 or 4, the elbow 55, the opening/closing valve 56, and the coupler plug 57.

After tube connection step S1 is ended as described above, suction step S2 is performed.

<Explanation of Suction Step>

Figure 2:
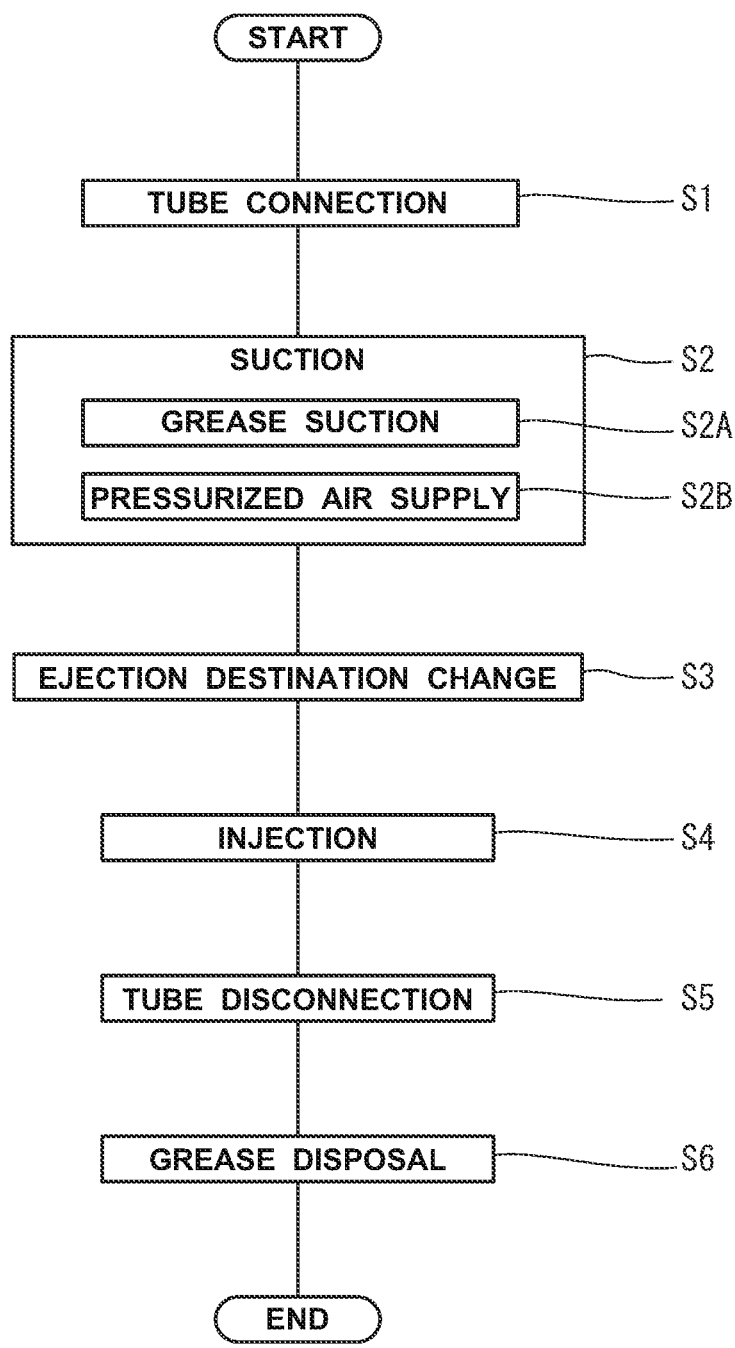
FIG. 2 is a flowchart for explaining the grease replacement method according to the first embodiment.

As shown in FIG. 2, suction step S2 according to this embodiment includes grease suction step S2A and pressurized air supply step S2B. Steps S2A and S2B are started by opening the first, second, third, and fourth opening/closing valves 13, 15, 17, and 19 of the control box 2. Grease suction step S2A is started when the first opening/closing valve 13 and third opening/closing valve 15 open. That is, a negative pressure is generated in the first and second vacuum ejectors 14 and 16, and air is sucked from the first air chamber 46 of each of the first and second suction air cylinders 3 and 4. Pressurized air supply step S2B is started when the second opening/closing valve 17 and fourth opening/closing valve 19 open, and pressurized air is supplied to the first and second discharge ports 32 and 37 of the first and second gear chambers 31 and 36. This pressurized air passes through the plurality of holes 87 of the connection joint 86, and radially blows off from the first and second discharge ports 32 and 37 in a plurality of directions in the first and second gear chambers 31 and 36.

When the air is drawn out from the first air chambers 46 of the first and second suction air cylinders 3 and 4, the pistons 42 rise, and the air in the first and second grease suction tubes 58 and 59 is drawn out into the second air chambers 47. Simultaneously, old grease in the first and second gear chambers 31 and 36 is drawn together with the air into the first and second grease suction tubes 58 and 59.

As shown in FIG. 5, the piston 42 stops when the upper end 42b abuts against the upper lid 44. In this state, the check valve 71 opens, and the air in the second air chamber 47 is drawn into the first air chamber 46 through the communication passage 73. Consequently, the old grease in the first and second gear chambers 31 and 36 is drawn out together with the air into the second air chambers 47 through the first and second grease suction tubes 58 and 59. Since the pressurized air is supplied from the first and second discharge ports 32 and 37 in this state, the old grease flows into the first and second grease suction tubes 58 and 59 by being pushed by the pressurized air. When performing suction step S2, the routes of air flows are changed by slightly operating the speed reducers in the first and second gear chambers 31 and 36, so a large amount of old grease can be sucked out.

Suction step S2 is continuously performed until there is no more old grease to be sucked out. Since the interior of the second air chamber 47 can visually be checked from outside the cylinder, it is possible to easily confirm that no old grease is sucked out any longer.

After the old grease is not sucked out any more, suction step S2 is ended by closing the first, second, third, and fourth opening/closing valves 13, 15, 17, and 19 of the control box 2. Ejection destination change step S3 is performed after suction step S2 is thus ended. Note that before ejection destination change step S3 is performed, new grease is filled in the second air chamber 47 of the injection air cylinder 5.

<Explanation of Ejection Destination Change Step>

Figure 8:
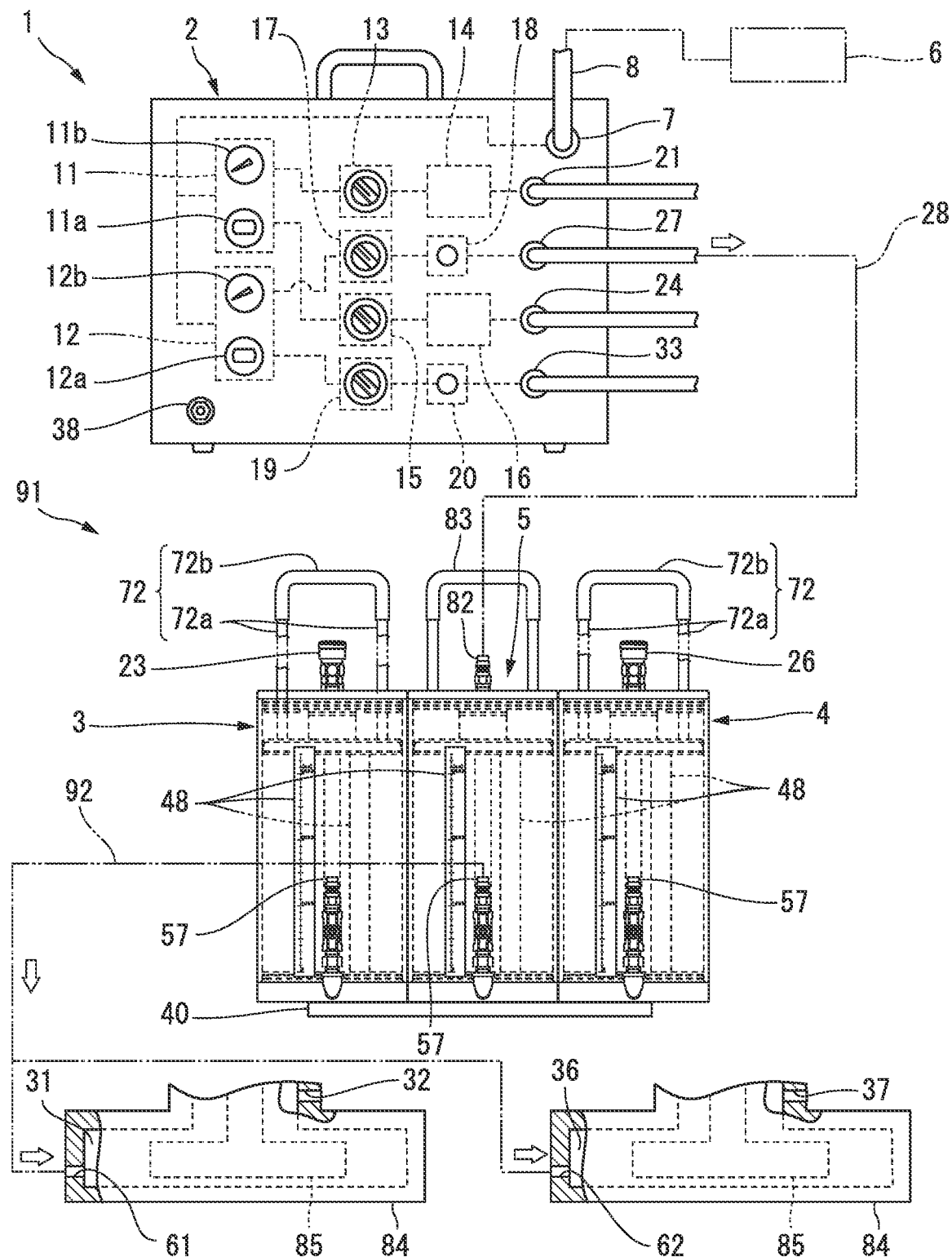
FIG. 8 is a front view showing the arrangement of the grease replacement apparatus when injecting grease.

In ejection destination change step S3, as shown in FIG. 8, the coupler plug 82 of the upper lid 44 of the injection air cylinder 5 is connected to the first or second ejection coupler socket 27 or 33 of the control box 2 by the third or fourth air tube 28 or 35. FIG. 8 shows a state in which the coupler plug 82 is connected to the first ejection coupler socket 27 by the third air tube 28. Note that the first and second air tubes 22 and 25 are used in only suction step S2 and hence can be removed in ejection destination change step S3.

Also, in ejection destination change step S3, the coupler plug 57 of the lower lid 45 of the injection air cylinder 5 is connected to the grease injection port 61 or 62 of the first gear chamber 31 or second gear chamber 36 by a grease injection tube 92. The first and second discharge ports 32 and 37 of the first and second gear chambers 31 and 36 are exposed to the atmosphere by removing the connection joints 86.

Injection step S4 is performed after the air tube connection states are changed as described above.

<Explanation of Injection Step>

Injection step S4 is performed by opening one of the second opening/closing valve 17 and fourth opening/closing valve 19 of the control box 2 (in FIG. 8, the opening/closing valve 17), which is connected to the injection air cylinder 5. When this opening/closing valve opens, pressurized air is supplied to the first air chamber 46 of the injection air cylinder 5, and new grease flows out from the second air chamber 47 because the piston 42 is pushed downward by the pressure of this air. This grease is injected into the first or second gear chamber 31 or 36 through the grease injection tube 92.

The injection amount of the new grease is desirably equal to the amount of the old grease sucked out into the first or second suction air cylinder 3 or 4. This injection amount can easily be measured by using the scale 48 formed on the cylindrical member 43 of the injection air cylinder 5. After grease injection is thus complete, the opening/closing valve (in FIG. 8, the second opening/closing valve 17) of the control box 2 is closed. After that, the connection destination of the grease injection tube 92 is changed to the grease injection port of the other one of the first gear chamber 31 and second gear chamber 36. Then, the opening/closing valve of the control box is opened again, and new grease is injected into the other gear chamber.

After a predetermined amount of the new grease is injected into the other gear chamber, tube disconnection step S5 is performed.

<Explanation of Tube Disconnection Step>

In tube disconnection step S5, all air tubes are disconnected from the first and second suction air cylinders 3 and 4 and injection air cylinder 5. Also, in tube disconnection step S5, grease nipples (not shown) are attached to the grease injection ports 61 and 62 of the first and second gear chambers 31 and 36, and plug members (not shown) are attached to the first and second discharge ports 32 and 37.

<Explanation of Grease Disposal Step>

In next grease disposal step S6, the first and second suction air cylinders 3 and 4 and injection air cylinder 5 are transported to a grease disposing site by the worker. This transportation can be performed by gripping the handles 72b of the first and second suction air cylinders 3 and 4 and the handle 83 of the injection air cylinder 5.

Grease disposal step S6 is performed by connecting grease discharge pipes (not shown) to the coupler plugs 57 of the lower lids 45 of the first and second suction air cylinders 3 and 4, and supplying pressurized air to the coupler sockets 23 and 26 of the upper lids 44, or by pushing the handle rods 72 downward by the worker. By thus operating the grease suction device 91 following the above procedures, the pistons 42 are pushed down, and old grease is discharged from the second air chambers 47 to the grease discharge pipes.

Effects of Embodiment

In the grease replacement method performed as described above, old grease in the first or second gear chamber 31 or 36 is discharged from the grease injection port 61 or 62 by suction in suction step S2. In this step, air flows into the first or second gear chamber 31 or 36 from the first and second discharge ports 32 and 37. In this embodiment, therefore, old grease is discharged without excessively raising the internal pressure of the first or second gear chamber 31 or 36, so a grease replacement method which facilitates discharging old grease can be provided.

Suction step S2 according to this embodiment is performed in a state in which pressurized air is supplied into the first and second gear chambers 31 and 36 from the first and second discharge ports 32 and 37. Since this makes it possible to push out old grease in the first and second gear chambers 31 and 36 by the pressurized air, a grease replacement method which further facilitates discharging old grease can be provided.

In suction step S2 according to this embodiment, the pressurized air is blown off in a plurality of directions in the first and second gear chambers 31 and 36 from the first and second discharge ports 32 and 37. Since the pressurized air is supplied to broad ranges in the gear chambers, the amount of grease to which the pressure of the pressurized air is transmitted increases. This makes it possible to provide a grease replacement method which further increases the discharge amount of old grease.

In the grease suction device 91 according to this embodiment, a negative pressure is introduced to the first air chamber 46 from the first or second vacuum ejector 14 or 16 as a negative pressure source. Consequently, the piston 42 rises, and air and grease are sucked from the first and second gear chambers 31 and 36.

The check valve 71 opens as the piston 42 rises, and old grease in the first and second gear chambers 31 and 36 is sucked together with air into the second air chamber 47. The old grease sucked into the second air chamber 47 adheres to the walls of the second air chamber 47 including the piston 42, and is stored in the second air chamber 47. This old grease is discharged from the second air chamber 47 when the piston 42 moves in a direction opposite to the above-mentioned direction.

Since, therefore, the grease suction device 91 according to this embodiment has the function of temporarily storing old grease and the function of discharging old grease, the worker can replace old grease in the first and second gear chambers 31 and 36 without touching the old grease.

The piston 42 according to this embodiment has the handle rod 72 parallel to the axes of the first and second suction air cylinders 3 and 4. The handle rod 72 projects outside the cylinder main body 41 through the upper lid 44 positioned in one end of the cylinder main body 41, and has the handle 72b in the end portion on the projection side.

In this embodiment, therefore, the worker can carry the first and second suction air cylinders 3 and 4 and injection air cylinder 5 by holding the handle 72b of the handle rod 72. Also, old grease in the first and second suction air cylinders 3 and 4 is discharged from the second air chambers 47 by pushing the handle rod 72 into the cylinder main body 41.

Accordingly, this embodiment can provide a grease suction device which facilitates the work when disposing old grease.

The cylindrical members 43 in which the pistons 42 of the first and second suction air cylinders 3 and 4 in this embodiment are fitted are formed by a transparent material. Therefore, it is possible to visually check old grease sucked from the first and second gear chambers 31 and 36, so the worker can easily determine the end timing of the suction work. Since this makes it possible to prevent the suction work from unnecessarily prolonging, grease replacement can efficiently be performed.

Second Embodiment

A grease replacement method according to the present invention can be performed by executing a process of raising the temperature of old grease in a gear chamber so that the viscosity of the grease decreases and the suction of the grease is facilitated. A form in which this process is performed will be explained with reference to FIGS. 9 and 10. Members which are the same as or equivalent to those explained with reference to FIGS. 1 to 8 are denoted by the same reference numerals in FIGS. 9 and 10, and a detailed explanation thereof will properly be omitted.

Figure 9:
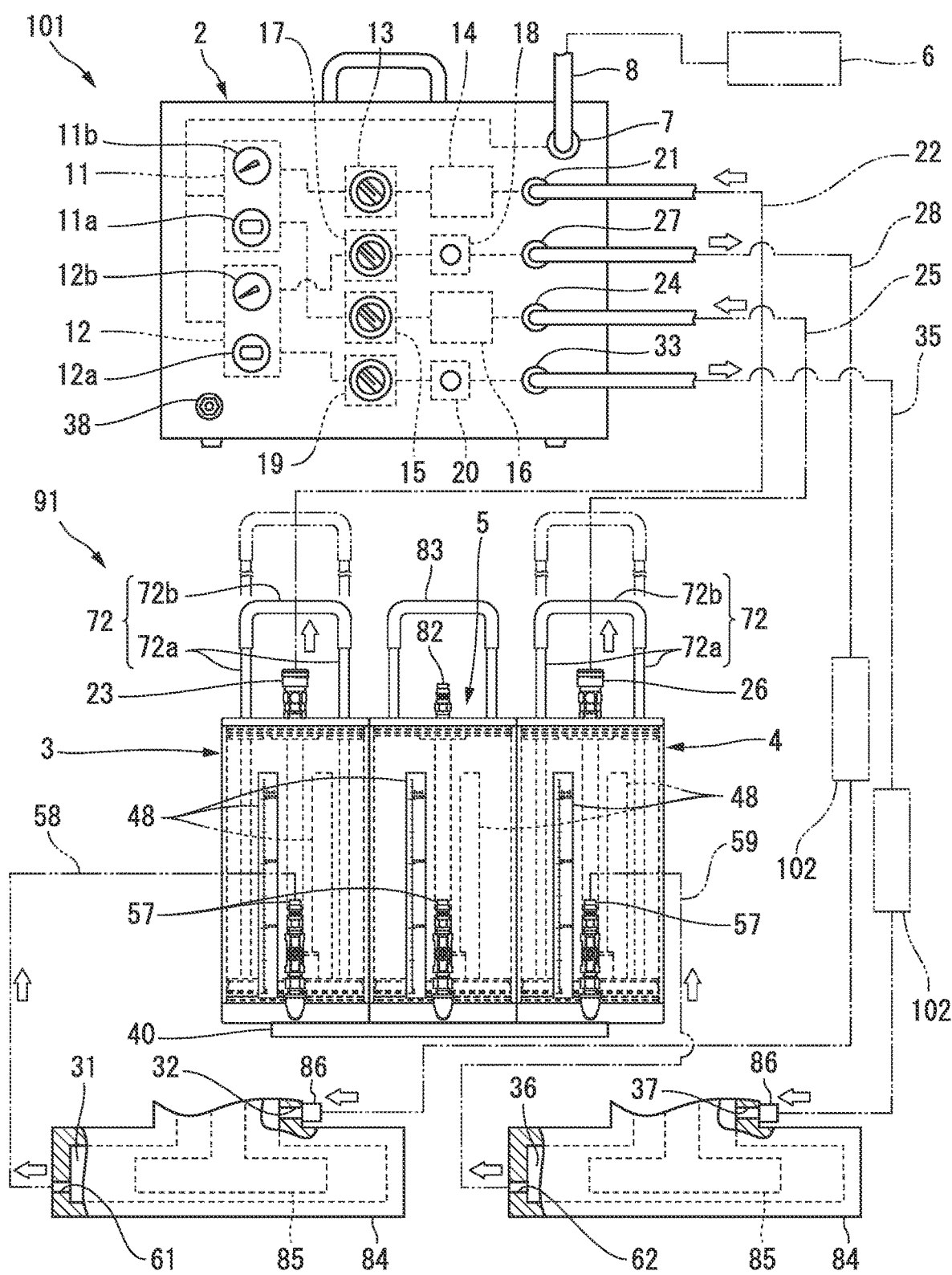
FIG. 9 is a front view showing the arrangement of a grease replacement apparatus to be used to perform a grease replacement method according to the second embodiment.
Figure 10:
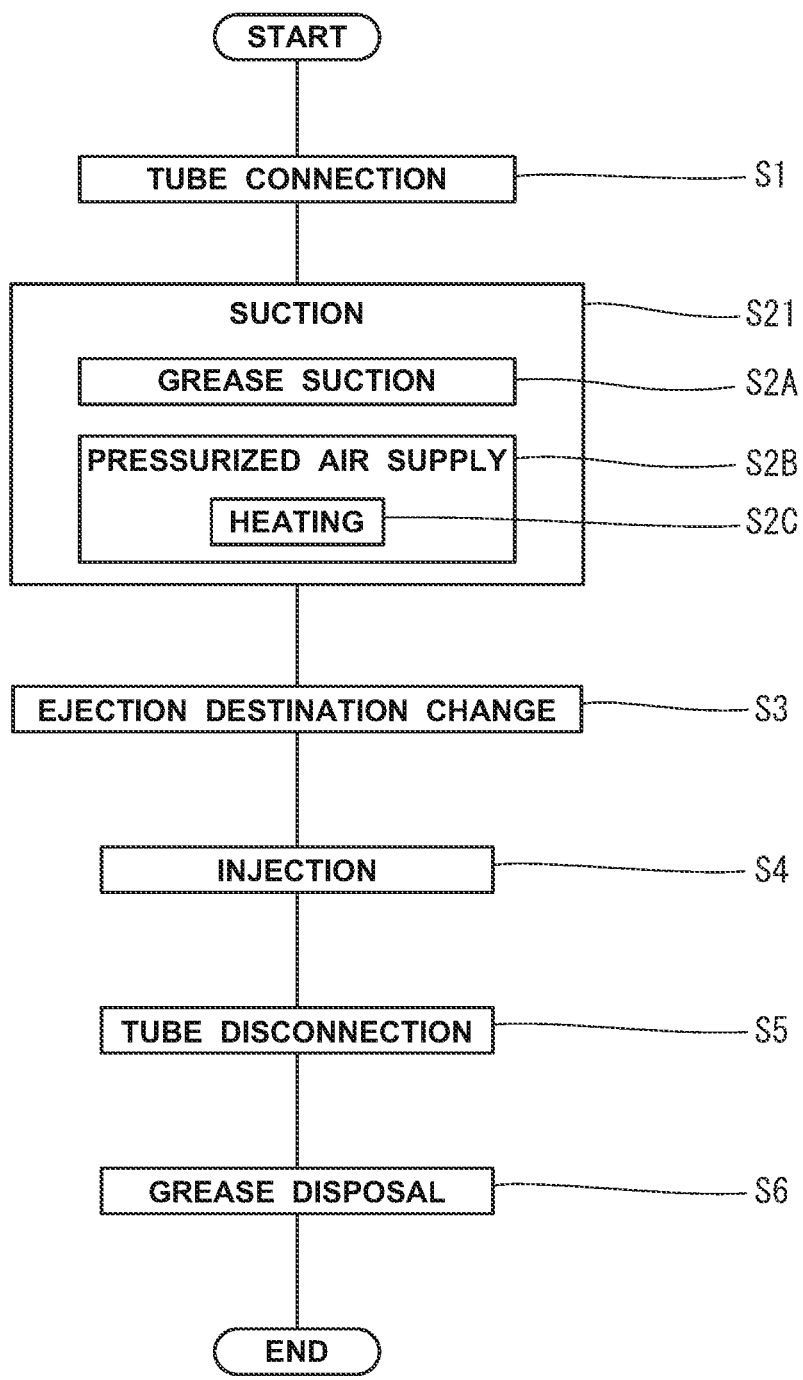
FIG. 10 is a flowchart for explaining the grease replacement method according to the second embodiment.

A grease replacement apparatus 101 shown in FIG. 9 has the same arrangement as that of the grease replacement apparatus 1 shown in FIG. 1 except the arrangement for supplying pressurized air. In the grease replacement apparatus 101, a heater 102 for heating pressurized air is formed midway along each of third and fourth air tubes 28 and 35 for supplying the pressurized air to first and second gear chambers 31 and 36.

When electricity is supplied, the heaters 102 raise their temperatures and heat the pressurized air passing through the third and fourth air tubes 28 and 35 to a predetermined temperature. This pressurized air having the raised temperature is supplied to the first and second gear chambers 31 and 36 and blown upon old grease, and the temperature of the old grease rises. Note that the grease temperature also rises due to the rise of the temperature in the first and second gear chambers 31 and 36 caused by the inflow of the pressurized air. It is generally known that the fluidity of grease rises when the temperature is about 20° C. Therefore, a device capable of heating pressurized air so that the temperature of grease rises to about 20° C. is used as the heater 102.

The grease replacement method when using the heaters 102 as described above will be explained with reference to FIG. 10. Unlike the grease replacement method shown in FIG. 2, the grease replacement method according to this embodiment includes suction step S21 of supplying pressurized air while using the heaters 102. In this grease replacement method, the contents of steps other than suction step S21 are the same as those of the grease replacement method shown in FIG. 2. Suction step S21 according to this embodiment has heating step S2C. Heating step S2C is included in pressurized air supply step S2B, and always performed in the process of supplying pressurized air. In heating step S2C, electricity is supplied to the heaters 102, and the heaters 102 heat pressurized air to a predetermined temperature as described above.

When the heated pressurized air is supplied to the first and second gear chambers 31 and 36 as disclosed in this embodiment, old grease in the first and second gear chambers 31 and 36 raises the temperature and decreases the viscosity, and this facilitates sucking the grease.

Accordingly, this embodiment further facilitates discharging old grease, and hence can provide a grease replacement method having a high grease replacement efficiency.

Third Embodiment

A grease replacement method according to the present invention can perform a process of dissolving old grease in a gear chamber so as to facilitate sucking the grease. A form of performing this process will be explained with reference to FIGS. 11 and 12. Members which are the same as or equivalent to those explained with reference to FIGS. 1 to 8 are denoted by the same reference numerals in FIGS. 11 and 12, and a detailed explanation thereof will properly be omitted.

Figure 11:
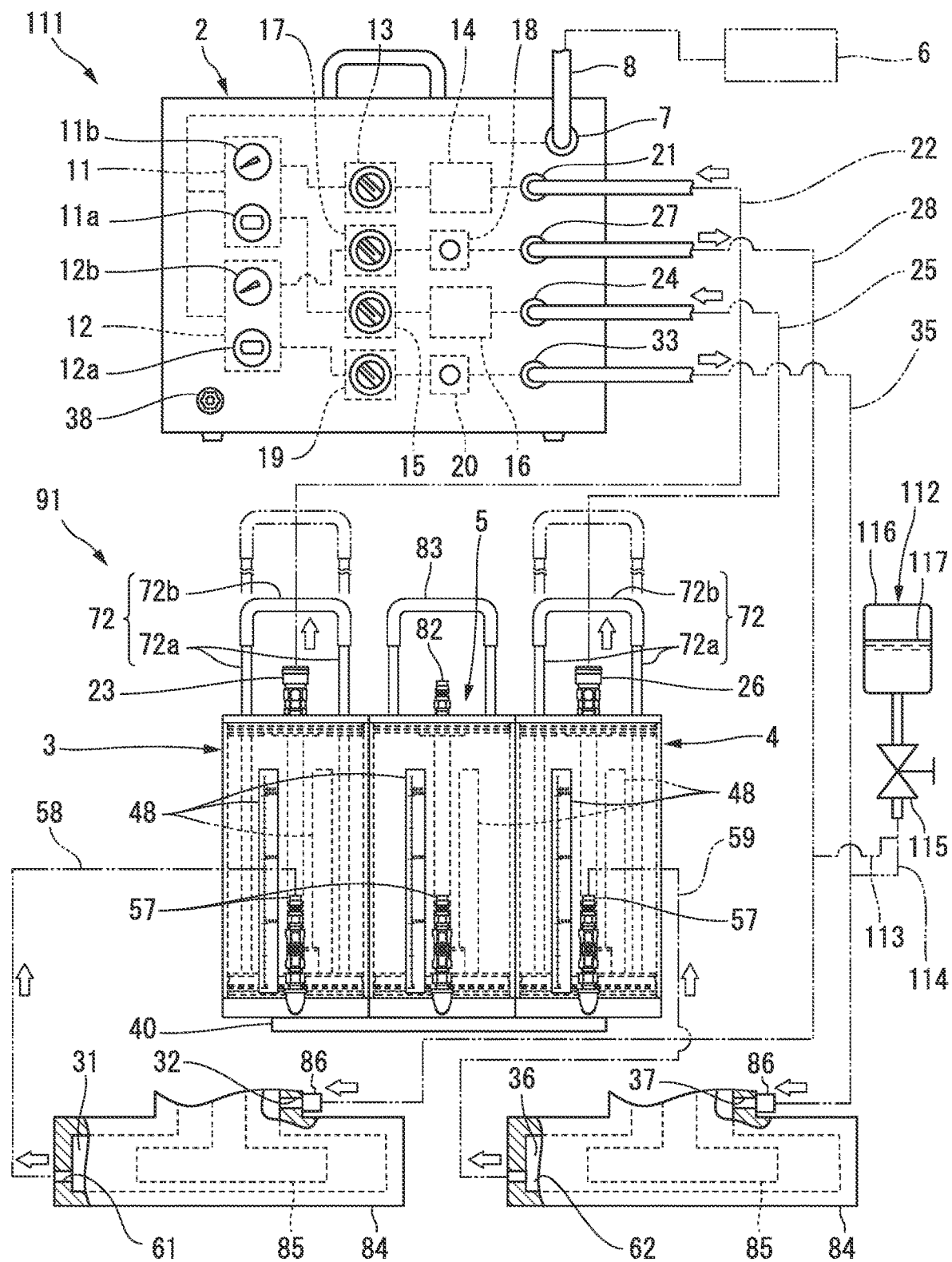
FIG. 11 is a front view showing the arrangement of a grease replacement apparatus to be used to perform grease replacement methods according to the third and fourth embodiments.

A grease replacement apparatus 111 shown in FIG. 11 has the same arrangement as that of the grease replacement apparatus 1 shown in FIG. 1 except the arrangement for supplying pressurized air. In the grease replacement apparatus 111, a solvent supply device 112 is connected to middle portions of third and fourth air tubes 28 and 35 for supplying pressurized air to first and second gear chambers 31 and 36.

The solvent supply device 112 includes an opening/closing valve 115 having a downstream end connected to the middle portions of the third and fourth air tubes 28 and 35 by communication pipes 113 and 114, and a solvent tank 116 connected to the upstream end of the opening/closing valve 115. A solvent 117 which dissolves grease is stored in the solvent tank 116. When the opening/closing valve 115 opens, the solvent 117 flows into the third and fourth air tubes 28 and 35 through the communication pipes 113 and 114. In this embodiment, the solvent 117 flows into the third and fourth air tubes 28 and 35 by gravity, and further flows into first and second gear chambers 31 and 36 through the tubes 28 and 35.

A grease replacement method when using the solvent 117 as described above will be explained with reference to FIG. 12. Unlike the grease replacement method shown in FIG. 2, the grease replacement method according to this embodiment includes suction step S22 of sucking grease dissolved by the solvent 117. In this grease replacement method, the contents of steps other than suction step S22 are the same as those of the grease replacement method shown in FIG. 2.

Tube connection step S1 according to this embodiment is performed by using the third and fourth air tubes 28 and 35 to which the solvent supply device 112 is connected.

Figure 12:
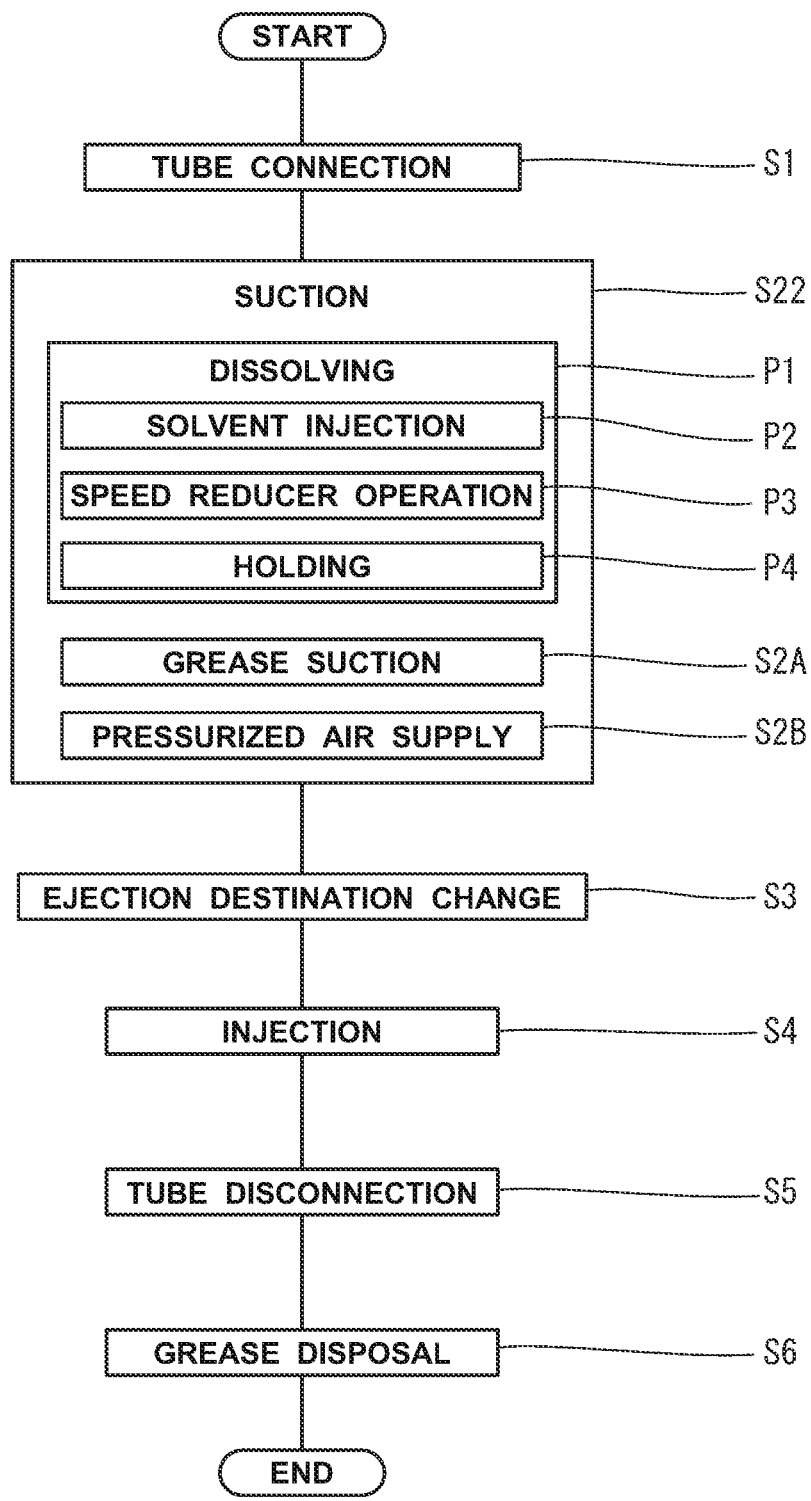
FIG. 12 is a flowchart for explaining the grease replacement method according to the third embodiment.

As shown in FIG. 12, suction step S22 according to this embodiment includes dissolving step P1, grease suction step S2A, and pressurized air supply step S2B. Dissolving step P1 includes solvent injection step P2, speed reducer operation step P3, and holding step P4. In dissolving step P1, solvent injection step P2 is performed first, and speed reducer operation step P3 and holding step P4 are performed in this order after that. Solvent injection step P2 is started by opening the opening/closing valve 115. Note that the opening/closing valve 115 is opened in a state in which no pressurized air is supplied to the third and fourth air tubes 28 and 35.

In solvent injection step P2, the solvent 117 is injected into the third and fourth air tubes 28 and 35 from the solvent tank 116 through the communication pipes 113 and 114. The solvent 117 flows into the first and second gear chambers 31 and 36 from the third and fourth air tubes 28 and 35. The flow rate of the solvent 117 in this state is set to such an extent that the first and second gear chambers 31 and 36 are filled with the solvent 117. When the first and second gear chambers 31 and 36 are filled with the solvent 117, old grease in the first and second gear chambers 31 and 36 dissolves and becomes flowable.

In speed reducer operation step P3, speed reducers in the first and second gear chambers 31 and 36 operate for a predetermined time. When the speed reducers thus operate, the solvent 117 dissolves old grease in almost the whole area of portions to be lubricated in the speed reducers.

In holding step P4, the state in which the solvent 117 is injected into the first and second gear chambers 31 and 36 is held for a predetermined time. When holding step P4 is performed, the solvent 117 dissolves the old grease in the first and second gear chambers 31 and 36, and the state of the grease becomes a liquid state or highly flowable state. The grease in a state like this is easily sucked in grease suction step S2A.

Accordingly, this embodiment further facilitates discharging old grease, and hence can provide a grease replacement method having a high grease replacement efficiency.

Fourth Embodiment

Figure 13:
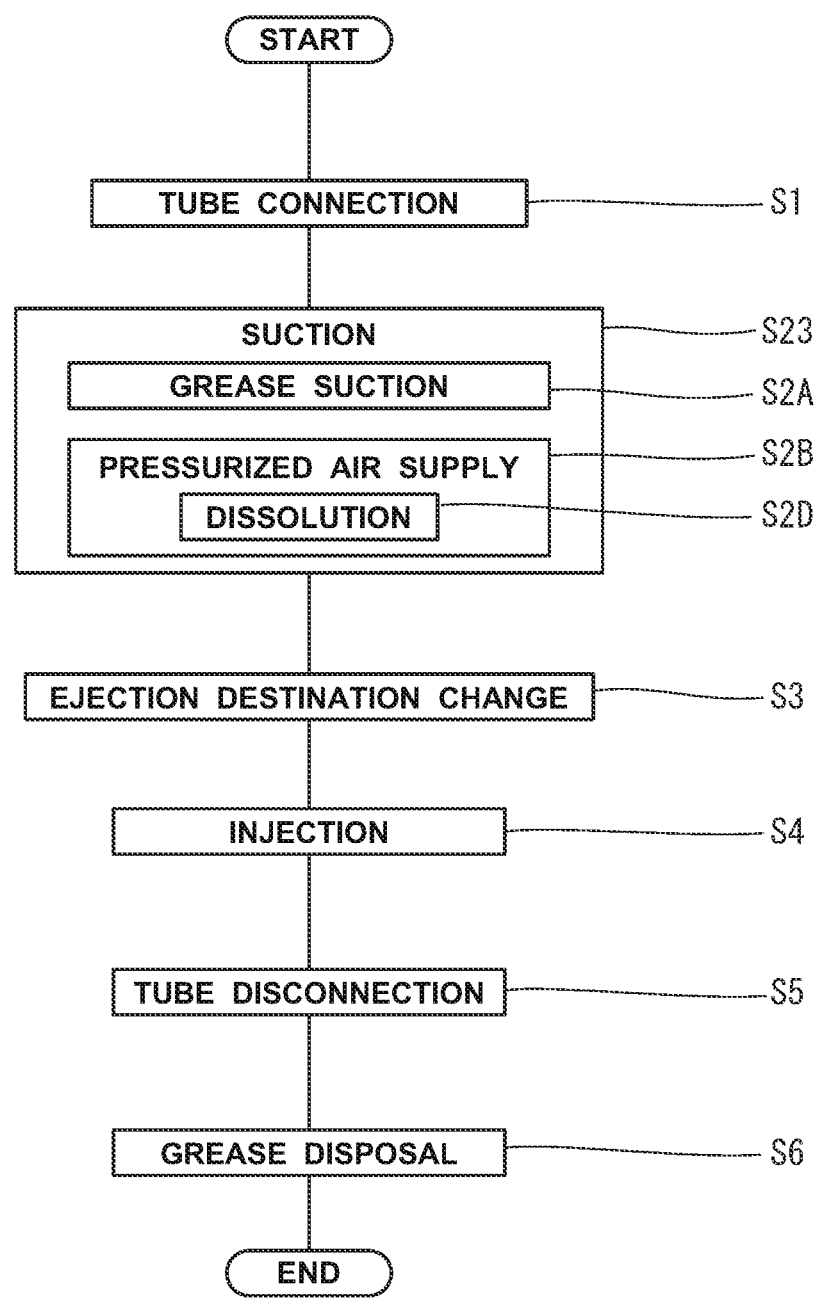
FIG. 13 is a flowchart for explaining the grease replacement method according to the fourth embodiment.

A grease replacement method which performs a process of dissolving grease in a gear chamber by a solvent can also be performed as shown in FIG. 13. Members which are the same as or equivalent to those explained with reference to FIGS. 1 to 8 and 11 are denoted by the same reference numerals in FIG. 13, and a detailed explanation thereof will properly be omitted.

The grease replacement method according to this embodiment can be performed by using a grease replacement apparatus 111 shown in FIG. 11. Note that in order to efficiently perform this grease replacement method, it is desirable to connect a solvent pump (not shown) to a solvent supply device 112 of the grease replacement apparatus 111. This solvent pump supplies a solvent 117 into third and fourth air tubes 28 and 35 from communication pipes 113 and 114 against the pressure of pressurized air in the third and fourth air tubes 28 and 35.

Unlike the grease replacement method shown in FIG. 2, the grease replacement method according to this embodiment includes suction step S23 of simultaneously supplying the pressurized air and solvent to first and second gear chambers 31 and 36. In this grease replacement method, the contents of steps other than suction step S23 are the same as those of the grease replacement method shown in FIG. 2.

Suction step S23 according to this embodiment has dissolving step S2D. Dissolving step S2D is included in pressurized air supply step S2B and always performed in a process of supplying pressurized air. In dissolving step S2D, the solvent 117 which dissolves grease is supplied into the third and fourth air tubes 28 and 35 by gravity or the solvent pump, and mixed in pressurized air.

This pressurized air mixed with the solvent flows into the first and second gear chambers 31 and 36 through the third and fourth air tubes 28 and 35, and comes in contact with old grease in the gear chambers 31 and 36. Since the solvent 117 adheres to the old grease and the old grease dissolves and becomes flowable, the old grease is easily pushed by the pressurized air, sucked from grease injection ports 61 and 62, and discharged outside the first and second gear chambers 31 and 36.

The state of grease in the first and second gear chambers 31 and 36 can be changed to a liquid state or highly flowable state by using the solvent 117 in this embodiment as well. This facilitates sucking old grease.

Accordingly, this embodiment further facilitates discharging old grease, and hence can provide a grease replacement method having a high grease replacement efficiency.

The grease suction device 91 disclosed in each embodiment described above includes the first and second suction air cylinders 3 and 4 in order to suck old grease from the first and second gear chambers 31 and 36 at the same time. However, the present invention is not limited to this, and the number of suction air cylinders can appropriately be changed.

Also, an example in which the injection air cylinder 5 is used to inject new grease is disclosed in each embodiment described above. However, new grease can also be injected by using a grease gun.

Furthermore, an example in which the vacuum ejectors 14 and 16 generate a negative pressure is disclosed in each embodiment described above. However, the negative pressure source is not limited to this, and it is also possible to use, e.g., an electric vacuum pump.

EXPLANATION OF THE REFERENCE NUMERALS AND SIGNS 1, 101, 111 . . . grease replacement apparatus, 3 . . . first suction air cylinder, 4 . . . second suction air cylinder, 23, 26 . . . coupler socket (first connecting member), 31 . . . first gear chamber, 32 . . . first discharge port, 36 . . . second gear chamber, 37 . . . second discharge port, 61, 62 . . . grease injection port, 41 . . . cylinder main body, 42 . . . piston, 44 . . . upper lid (wall in one end), 45 . . . lower lid (wall in the other end), 46 . . . first air chamber, 47 . . . second air chamber, 55 . . . elbow (second connecting member), 56 . . . opening/closing valve (second connecting member), 57 . . . coupler plug (second connecting member), 71 . . . check valve, 73 . . . communication passage, 84 . . . case, 91 . . . grease suction device, S2, S21, S22 . . . suction step, S2C . . . heating step, S2D . . . dissolving step, S4 . . . injection step, P1 . . . dissolving step

The invention claimed is:

1. A grease replacement method of replacing grease in a case including:
   a sealable gear chamber accommodating a gear as a member to be lubricated;
   a grease injection port configured to inject grease into the gear chamber; and
   a discharge port configured to discharge the grease in the gear chamber,
   the method being performed by:
   a suction step of sucking the grease in the gear chamber from the grease injection port with the discharge port being open, and discharging the grease outside the case; and
   an injection step of injecting new grease into the grease injection port and supplying the new grease to the gear.

2. The grease replacement method according to claim 1, wherein the suction step is performed in a state in which pressurized air is supplied into the gear chamber from the discharge port.

3. The grease replacement method according to claim 2, wherein the suction step includes a heating step of heating the pressurized air to a predetermined temperature.

4. The grease replacement method according to claim 3, wherein the pressurized air is blown in the gear chamber in a plurality of directions thereof from the discharge port.

5. The grease replacement method according to claim 2, wherein the suction step includes a dissolving step of dissolving the grease in the gear chamber by a solvent.

6. The grease replacement method according to claim 5, wherein the pressurized air is blown in the gear chamber in a plurality of directions thereof from the discharge port.

7. The grease replacement method according to claim 2, wherein the pressurized air is blown in the gear chamber in a plurality of directions thereof from the discharge port.

8. A grease suction device comprising:
an air cylinder including a cylinder main body which includes a cylindrical member and walls closing two ends of the cylindrical member, and a piston which partitions the cylinder main body into a first air chamber and a second air chamber;
a valve formed in the piston configured to have the first air chamber and the second air chamber communicate with each other when a spacing between the piston and a wall in one end of the cylinder main body is less than a predetermined distance, and configured to block the communication between the first air chamber and the second air chamber when the spacing is equal to or greater than the predetermined distance;
a first connecting member formed on the wall in one end of the cylinder main body configured to connect a negative-pressure source to one of the first air chamber and the second air chamber; and
a second connecting member formed on a wall in the other end of the cylinder main body configured to connect a grease injection port of a case into which grease is injected to the other one of the first air chamber and the second air chamber.

9. The grease suction device according to claim 8, wherein
the case includes a discharge port configured to discharge grease; and
a pressurized air supply device configured to supply pressurized air is connected to the discharge port.

10. The grease suction device according to claim 9, wherein the pressurized air supply device includes a heater configured to heat the pressurized air to a predetermined temperature.

11. The grease suction device according to claim 10, wherein
the piston includes a handle rod parallel to an axis of the air cylinder, and
the handle rod projects outside the cylinder main body through the wall in one end of the cylinder main body, and includes a handle in a projection-side end portion.

12. The grease suction device according to claim 10, wherein a cylindrical portion of the cylinder main body, in which the piston is fitted, is formed by a transparent material.

13. The grease suction device according to claim 9, wherein
the piston includes a handle rod parallel to an axis of the air cylinder, and
the handle rod projects outside the cylinder main body through the wall in one end of the cylinder main body, and includes a handle in a projection-side end portion.

14. The grease suction device according to claim 9, wherein a cylindrical portion of the cylinder main body, in which the piston is fitted, is formed by a transparent material.

15. The grease suction device according to claim 8, wherein
the case includes a discharge port configured to discharge grease, and
a solvent supply device configured to supply a solvent which dissolves grease is connected to the discharge port.

16. The grease suction device according to claim 15, wherein
the piston includes a handle rod parallel to an axis of the air cylinder, and
the handle rod projects outside the cylinder main body through the wall in one end of the cylinder main body, and includes a handle in a projection-side end portion.

17. The grease suction device according to claim 15, wherein a cylindrical portion of the cylinder main body, in which the piston is fitted, is formed by a transparent material.

18. The grease suction device according to claim 8, wherein
the piston includes a handle rod parallel to an axis of the air cylinder, and
the handle rod projects outside the cylinder main body through the wall in one end of the cylinder main body, and includes a handle in a projection-side end portion.

19. The grease suction device according to claim 18, wherein a cylindrical portion of the cylinder main body, in which the piston is fitted, is formed by a transparent material.

20. The grease suction device according to claim 8, wherein a cylindrical portion of the cylinder main body, in which the piston is fitted, is formed by a transparent material.

* * * * *